June 13, 1950     J. M. CALLAN     2,511,564
DISTORTION ANALYSIS
Filed Dec. 26, 1946     2 Sheets-Sheet 1
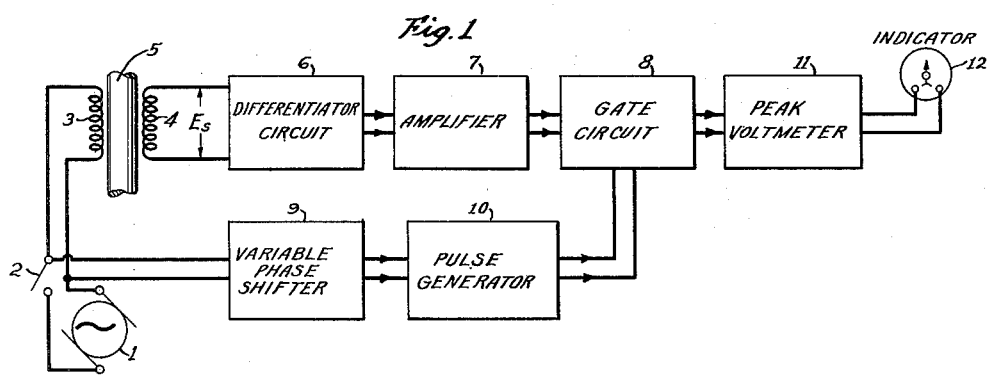
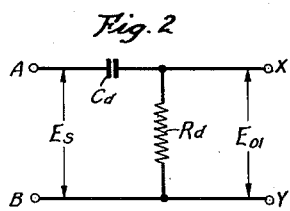
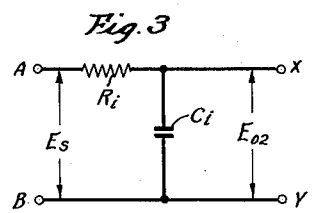
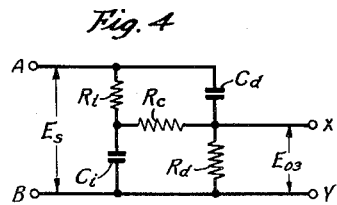
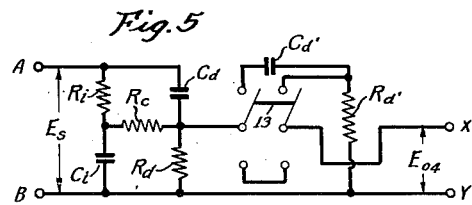
INVENTOR
Joseph M. Callan
BY
Pennie, Edmonds, Morton & Barrows.
ATTORNEYS June 13, 1950  J. M. CALLAN  2,511,564
DISTORTION ANALYSIS Filed Dec. 26, 1946  2 Sheets-Sheet 2

INVENTOR
Joseph M. Callan
BY
Pennie, Edmonds, Morton & Barrows
ATTORNEYS

Patented June 13, 1950

2,511,564

UNITED STATES PATENT OFFICE 2,511,564

DISTORTION ANALYSIS

Joseph M. Callan, Jackson Heights, N. Y., assignor to Magnetic Analysis Corporation, Long Island City, N. Y., a corporation of New York Application December 26, 1946, Serial No. 718,557

13 Claims. (Cl. 175—183)

This invention relates to magnetic testing of ferromagnetic materials and involves the analysis of wave form distortion which is an indication of the conditions of such materials.

Heretofore, in systems of magnetic inspection and testing, it has been proposed to energize the material to be inspected with a sinusoidal current and to indicate in some manner the resulting wave form distortion. It has, however, been found difficult under some conditions to select and to amplify the exact portion of the distorted wave which best indicates the characteristics of the material such as hardness and analysis, as well as flaws, to be observed without the introduction of interfering and confusing indications of the remaining portions of the distorted wave or of the sinusoidal wave or both. The present invention provides an extremely simple and reliable method and means for analysis of such distortion waves substantially without the interference and confusion previously encountered.

More particularly, this invention contemplates subjecting the specimen to a substantially sinusoidal alternating-current magnetic field whereby the flux of such field is distorted, producing from the flux of such field an electric potential wave of correspondingly distorted form, differentiating the potential wave to produce a differential wave, or integrating and simultaneously differentiating the potential wave and algebraically adding the respective outputs to produce an approximately differential wave, of an instantaneous amplitude which is a function of the distortion of the potential wave, separately deriving from the source of the energizing current pulses timed and of duration to correspond to the phase and duration of a portion of the differential wave desired to be indicated, selecting a portion of the differential wave by suppressing under the control of the pulses all of the differential wave except the desired portion and indicating the selected portion.

It will be assumed in the following discussion of the circuits used to obtain the desired information from the differential wave that the important indications sought are found in the maximum amplitude of the sharp peaks, although it is frequently desirable to investigate other portions of the wave form.

The invention will best be understood from the following description considered together with the drawings, in which:

Fig. 1 is a partial schematic and partially block diagram of an analysis system in accordance with the invention;

Fig. 2 is a diagram of a differentiator circuit for use with the invention;

Fig. 3 is a diagram of an integrator circuit for use with the invention;

Fig. 4 is a diagram of a combined integrator and differentiator circuit;

Fig. 5 is a diagram of a combined integrator-differentiator circuit which by operation of a switch effectively becomes two differentiator circuits coupled in tandem;

Figure 6:
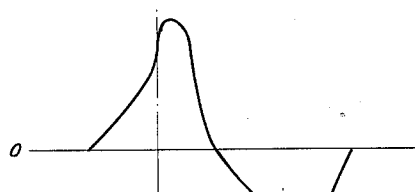
Fig. 6 represents an example of a distorted wave form.

Referring now to Fig. 1, a circuit suitable for testing or inspection, in accordance with this invention, is represented as comprising a suitable source 1 of alternating current connected through switch 2 to energizing coil 3 which should be disposed in inductive relation to the material 5 under test. It is assumed that material 5 has magnetic properties. The power source 1 should provide a substantially sinusoidal wave form and preferably would be of a frequency within the audible range, viz., say from 60 to 20,000 cycles, although the frequency is not especially critical. If now a suitable detector or pick-up coil 4 is disposed in inductive relation to the specimen of material 5, an alternating voltage $E_s$ will be developed across coil 4. It is preferable, although not essential, that coils 3 and 4 be symmetrically arranged with respect to specimen 5 and to each other by being wound concentrically and arranged so that the specimen can be passed through them.

As is well known in the art, the introduction of a specimen of magnetic material into a sinusoidal magnetic field will distort it so that a voltage generated by that field will, in turn, produce a voltage wave of a form correspondingly distorted. This distorted voltage wave here referred to as the signal $E_s$ is impressed upon a differentiator circuit 6, the function of which will be described in more detail below. It may here be mentioned, however, that this circuit 6 is to be understood as including, if desired, a plurality of differentiator circuits coupled together in tandem, or in the alternative, may comprise an integrator circuit coupled to one or more differentiator circuits. The output of differentiator circuit 6 is coupled to the input of a suitable amplifier 7. The output of amplifier 7 is, in turn, connected to the input of a gate circuit 8, well known in the art, and the output of gate circuit 8 is connected to a suitable voltmeter circuit 11, preferably of the peak voltmeter type. The output of peak voltmeter 11 includes a suitable indicator 12 which may be of the meter type, as shown, or may comprise an oscilloscope. In order to show the complete wave form, an oscilloscope may be connected in known manner to the output of the "differentiator" circuit 6 where it will indicate the differentiated or integrated and differentiated wave directly.

In order to control the gate circuit 8 so that only the desired portion of the distorted wave form is permitted to pass into the voltmeter circuit system 11, 12, a variable phase shifter 9 and pulse generator 10 are provided. The variable phase shifter 9 is operated by power derived from the power source 1, as shown, as is, in turn, pulse generator 10, which is connected to the output of the phase shifter. Thus pulses generated by generator 10 are impressed upon gate circuit 8 in well known manner, so that the gate circuit "opens" to impress on voltmeter 11 signals received from amplifier 7, only for such intervals, and at such instants as are determined by adjustment of phase shifter 9 and pulse generator 10. This pulse generator is so arranged that the time at which the pulse is generated always coincides with a predetermined phase point of the output wave from the phase shifter, the particular phase point being fixed by the design or constants of the circuit. Thus in the foregoing discussion the pulse length has been assumed to be longer than the duration of the voltage peaks which it is desired to measure. This assumption has been made merely for convenience. In some cases where it might be desirable to investigate the voltage peaks more in detail it may be preferable to use a pulse of considerably shorter duration. The duration of the pulse may, of course, be adjusted as desired by the usual adjustment provided in the pulse generator 10 in Fig. 1.

Referring now to the differentiator circuit of Fig. 2, if a voltage $E_s$ is impressed on the input terminals A, B, the voltage wave $E_{01}$ appearing at the output terminals X, Y is related to it approximately by the equation $$E_{01} = \frac{dE_s}{dt} \quad (1)$$

Similarly, referring to the integrator circuit of Fig. 3, if a voltage $E_s$ is impressed on the input terminals A, B, the voltage wave $E_{02}$ appearing at the output terminals X, Y is related to it approximately by the equation $$E_{02} = \int E_s dt \quad (2)$$

Now, if the voltage wave, or signal $E_s$ appearing across the terminals of secondary coil 4 (Fig. 1) is distorted due to the presence within its field of the magnetic test specimen 5, then this voltage may be expressed by the equation $$E_s = A \sin(\omega t + \phi) + B \sin(2\omega t + \phi_2) + C \sin(3\omega t + \phi_3) + \ldots \quad (3)$$

Here the term $A \sin(\omega t + \phi)$ is the fundamental frequency of the energizing source 1, and may be altered by, but is not generated within, the test specimen.

As above indicated, it is in many instances desirable to eliminate, or at least to attenuate, the fundamental frequency and deal only with those components generated within the test material which are represented by the terms remaining in the equation after the elimination of the fundamental. In accordance with this invention the fundamental frequency may be attenuated by subjecting the signal to differentiation. This result is indicated by the following equation:

$$E_{01} = \frac{dE_s}{dt} = A \cos(\omega t + \phi_1) + 2B \cos(2\omega t + \phi_2) + 3C \cos(3\omega t + \phi_3) + \cdots \quad (4)$$

From this it can be seen, by noting the change in the coefficients for each term shown, that the higher order harmonics have been accentuated in relation to the fundamental frequency.

Upon integration, the voltage becomes approximately $$E_{02} = \int E_s dt = -A \cos(\omega t + \phi_1) - \tfrac{1}{2}B \cos(2\omega t + \phi_2) - \tfrac{1}{3}C \cos(3\omega t + \phi_3) - \ldots \quad (5)$$

Here it will be noted that the relative importance of the fundamental frequency has been accentuated in relation to the higher harmonics.

If, further in accordance with the invention, the results of the two above processes are added, the following result is approximately obtained:

$$E_{01} + E_{02} = \frac{dE_s}{dt} + \int E_s dt = 3/2 B \cos(2\omega t + \phi_2) + 8/3 C \cos(3\omega t + \phi_3) + \cdots \quad (6)$$

Thus the fundamental term representing the frequency (assumed to be of sine-wave form) of source 1 has been eliminated, and if the succeeding terms in the equation are examined it is found that those corresponding to the higher frequencies are increasingly accentuated. If another stage of differentiation follows the first, the higher frequency components are still further accentuated in the output signal. From this it can be seen that a plurality of stages of differentiation may be desirable in some instances.

The apparatus and method of the invention are useful in detecting and measuring differences in magnetic material by analyzing wave forms, as distinguished from the analysis of the material, per se. For example, variations in hardness and in analysis of the metal, as well as physical variations such as flaws and changes in dimensions, will produce changes in the mentioned wave form distortion which, by means of the present invention, can be measured or observed. The distortions thus detected may be empirically correlated to certain characteristics, flaws, defects or other conditions of the material. Therefore, in applying the method of the invention to a practical case, a sample of material having the desired characteristics would first be tested or inspected in order to establish a reading or wave pattern to be employed as a standard. Subsequent inspections of unknown samples will reveal similar readings or patterns only if the test and standard samples are alike. As a result of experience it is frequently possible to interpret observed differences in readings or patterns quantitatively as well as qualitatively, but, as before, this is an empirical procedure.

The practical results of employing circuits providing integration and differentiation will best be understood by reference to the wave forms illustrated in Figs. 6–9, inclusive. In Fig. 6 is shown a typical wave shape, of voltage that might appear across the terminals of secondary coil 4 when a magnetic sample within its field is periodically magnetized by a sinusoidal alternating current flowing in primary coil 3. It will be noted that this curve is symmetrical and that the original sinusoidal wave has been distorted by the effect of the magnetic material.

Figure 7:
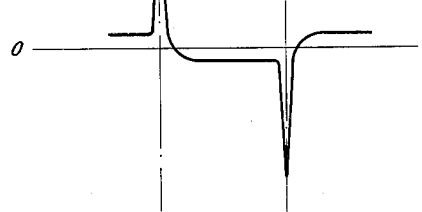
Fig. 7 represents the wave form of Fig. 6 after differentiation.

Fig. 7 illustrates graphically the resultant wave form which may be observed at the output terminals X, Y of a single stage of differentiation, such as illustrated in Fig. 2. It will be noted that the sharp peak appearing above the zero axis represents, and in fact its instantaneous amplitude is a function of, the distortion of the voltage wave illustrated in Fig. 6. In other words, the magnitude and polarity of the output voltage (Fig. 2 and Fig. 7) is a measure of the slope of the original voltage wave fed into the differential circuit. Figure 7, therefore, indicates maximum amplitudes where the slope of the curve of Fig. 6 is a maximum, and at all other points of the curve of Fig. 7 the magnitudes are proportional to the slopes of the original curve of Fig. 6. This can be seen from the fact that the peak of the curve of Fig. 7 is directly beneath the maximum slope of the curve of Fig. 6.

Figure 8:
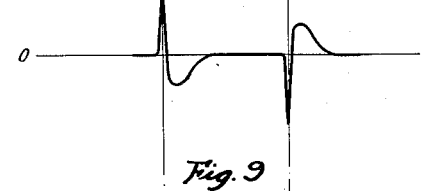
Fig. 8 represents the wave form of Fig. 6 after having been twice differentiated.

When the signal voltage $E_s$ is twice differentiated, as by the use of two differentiator circuits, such as that of Fig. 2, coupled in tandem, the effect of the fundamental is further decreased, as is illustrated in Fig. 8. Two such circuits coupled in tandem are illustrated in the diagram of Fig. 5, it being assumed that the switch 13 is thrown to its upward position. Thus the curve of Fig. 8 can be assumed to represent voltage $E_{o4}$. The values of the curve of Fig. 8 which result from the two differentiations of the voltage wave of Fig. 6 represent the magnitudes of the slopes of Fig. 7, viz., the rate of change of the slope of the curve of Fig. 6. Consequently these successive differentiations have the effect of emphasizing any irregularities or distortions contained in the original voltage wave. By use of such differentiation circuits in accordance with the invention a voltage wave form is produced which, for magnetic testing in general, consists primarily of one or more sharp voltage peaks (as shown in Figs. 7 and 8), by which it becomes possible to employ simple measuring and indicating circuits.

The substantially straight portion of the wave form of Fig. 7 displaced from the zero axis, when differentiated results in a substantially horizontal line not displaced from the zero axis, as shown in Fig. 8. In Fig. 8 the maximum amplitude of the sharp peak is a measure of the slope of the front of the corresponding peak of Fig. 7, and the maximum amplitude of the rounded portion of Fig. 8 is a measure of the maximum slope of the trailing edge of the same peak of Fig. 8.

Figure 9:
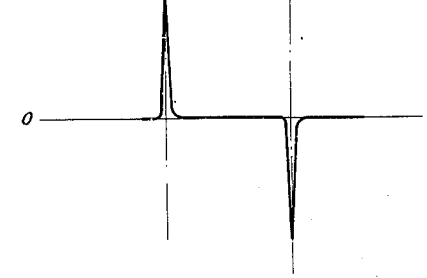
Fig. 9 represents the wave form of Fig. 6 after having been integrated and differentiated, and the resulting voltage waves of the two processes algebraically added to produce an approximately differential wave.

For some purposes it is preferable that the final wave form to be indicated comprise solely a sharp peak with respect to the zero axis. Such a wave form is shown in Fig. 9, although this representation is more nearly ideal than would usually be achieved in practice because no circuit arrangement is perfect. The wave form of Fig. 9, which may be said to be a graphical representation of the output voltage $E_{o3}$ of Fig. 4, will result from the algebraic addition of integration and differentiation products. The circuit of Fig. 4 is similar to the circuit of Fig. 3 coupled by resistor $R_c$ to a circuit similar to that of Fig. 2. In effect, the integrator and differentiator circuits are coupled to the signal source in parallel. Such a circuit arrangement is also shown in Fig. 5, assuming the switch 13 to be thrown in the downward direction. In a practical testing apparatus such as that of Fig. 1, the element 6 may preferably comprise the circuit arrangement of Fig. 5, because it permits at will a selection of double differentiation or integration and differentiation merely by throwing a switch.

The selection of the values for circuit elements to be used in the system of this invention may readily be made by those skilled in the art in accordance with the requirements in any given case. Accordingly, it is unnecessary here to set forth specific circuit constants. It may be helpful, however, to indicate certain general relationships in the magnitudes of circuit elements which have been found to provide satisfactory operation. For example, in assembling a circuit arrangement to provide for differentiation, as in Fig. 2, $C_dR_d$ may be much less than $T_1$, defined below. Similarly, in a circuit arrangement to provide for integration, such as the circuit of Fig. 3, $C_iR_i$ may be much greater than $T_2$ defined below. And, finally, in connection with a combination integration and differentiation circuit, as shown in Fig. 4, $C_dR_d$ may be much less than $T_1$; and $R_c$ should be much greater than $R_d$ and much greater than $C_if$.

In connection with the foregoing relationships, $T_1$ is the time for one cycle of the highest frequency component to be considered in the differentiation process, keeping in mind that the smaller the time $T_1$, the more nearly perfect is the differentiation process, and the smaller is the resulting output voltage. $T_2$ is the time for one cycle of the fundamental frequency, and $f$ is the fundamental frequency. The remaining quantities are represented in the diagrams, Figs. 2–5.

What is claimed is:

1. The method of inspecting magnetic material by wave form analysis thereof which comprises generating an electromagnetic flux from an alternating energizing current, impressing said flux on a specimen of magnetic material to be inspected, whereby said flux is distorted, producing from said flux an electric potential wave of correspondingly distorted form, differentiating said potential wave to produce a differential wave of an instantaneous amplitude which is a function of the distortion of said potential wave, amplifying said differential wave, separately deriving from the source of said energizing current, pulses timed and of duration to correspond to the phase and duration of a portion of said differential wave desired to be indicated, selecting a portion of said differential wave by suppressing under the control of said pulses all of said differential wave except said desired portion, and indicating said selected portion.

2. The method of inspecting magnetic material by wave form analysis thereof which comprises generating an electromagnetic flux from a substantially sinusoidal alternating current, impressing said flux on a specimen of magnetic material to be inspected, whereby said flux is distorted, producing from said flux an electric potential wave of correspondingly distorted form, differentiating said potential wave to produce a first differential wave the amplitude of any point of which is a measure of the rate of change of instantaneous amplitude of said potential wave, differentiating said first differential wave to produce a second differential wave which is a measure of the rate of change of instantaneous amplitude of said first differential wave, and therefore is a measure of the rate of rate of change of instantaneous amplitude of said potential wave, amplifying said second differential wave, selecting a portion of said second differential wave to be indicated by suppressing all of said second differential wave except said selected portion thereof, and indicating said selected portion.

3. The method of inspecting magnetic material by wave form analysis thereof which comprises generating an electromagnetic flux from a substantially sinusoidal alternating energizing current, impressing said flux on a specimen of magnetic material to be inspected, whereby said flux is distorted, producing from said flux an electric potential wave of correspondingly distorted form, integrating and differentiating said potential wave, algebraically adding the integrated and differentiated waves to produce an approximately differential wave of an instantaneous amplitude which is a function of the distortion of said potential wave and which is substantially free from sinusoidal components of said energizing current, amplifying said approximately differential wave, selecting a portion of said amplified differential wave by suppressing all of said differential wave except the selected portion thereof, and indicating said selected portion.

4. The method of inspecting magnetic material by wave form analysis thereof which comprises generating an electromagnetic flux from an alternating energizing current, impressing said flux on a specimen of magnetic material to be inspected, whereby said flux is distorted, producing from said flux an electric potential wave of correspondingly distorted form, differentiating said potential wave to produce a differential wave of an instantaneous amplitude which is a function of the distortion of said potential wave, separately deriving from the source of said energizing current, pulses timed and of duration to correspond to the phase and duration of a portion of said differential wave desired to be indicated, selecting a portion of said differential wave by suppressing under the control of said pulses all of said differential wave except said desired portion, and indicating said selected portion.

5. The method of inspecting magnetic material by wave form analysis thereof which comprises generating an electromagnetic flux from a substantially sinusoidal alternating energizing current, impressing said flux on a specimen of magnetic material to be inspected, whereby said flux is distorted, producing from said flux an electric potential wave of correspondingly distorted form, differentiating said potential wave to produce a first differential wave, the amplitude of any point of which is a measure of the rate of change of instantaneous amplitude of said potential wave, differentiating said first differential wave to produce a second differential wave which is a measure of the rate of change of instantaneous amplitude of said first differential wave, and therefore is a measure of the rate of rate of change of instantaneous amplitude of said potential wave, selecting a portion of said second differential wave to be indicated by suppressing all of said second differential wave except said selected portion thereof, and indicating said selected portion.

6. The method of inspecting magnetic material by wave form analysis thereof which comprises generating an electromagnetic flux from a substantially sinsoidal alternating energizing current, impressing said flux on a specimen of magnetic material to be inspected, whereby said flux is distorted, producing from said flux an electric potential wave of correspondingly distorted form, integrating and differentiating said potential wave to produce an approximately differential wave of an instantaneous amplitude which is a function of the distortion of said potential wave and which is substantially free from sinusoidal components of said energizing current, selecting a portion of said approximately differential wave and indicating said selected portion.

7. In a system for magnetic inspection of materials by analysis of wave form distortion, a source of substantially sinusoidal alternating current energizing voltage, an energizing coil connectible thereto and adapted to be placed in inductive relation to a specimen to be inspected, a test coil adapted to be placed in inductive relation to said specimen, a differentiating circuit having input and output sides, said test coil being connected to said input side, a gate circuit, an amplifier having an input connected to said output side and an output connected to said gate circuit, a peak voltmeter circuit connected to be energized by said gate circuit, a variable phase shifter energized by said energizing voltage, a pulse generator controlled by said phase shifter, connections from said pulse generator to said gate circuit such that the output of said gate circuit is controlled in accordance with the phase of pulses from said pulse generator, and an indicator actuated by said voltmeter circuit.

8. In a system for magnetic inspection of materials by analysis of wave form distortion, means including a source of alternating current for establishing a substantially sinusoidal alternating current magnetic field, means for inserting in said field a specimen of material to be inspected, a test coil adapted to be placed in inductive relation to said specimen, an amplifier, an integrating circuit connected between said coil and said amplifier, a gate circuit, connections by which output current from said amplifier is impressed on said gate circuit, a variable phase shifter energized by alternating current from said source, a pulse generator controlled by said phase shifter, connections from said pulse generator to said gate circuit such that the output of said gate circuit is controlled in accordance with the phase of pulses from said pulse generator, and an indicator system responsive to the output of said gate circuit.

9. In a system for magnetic inspection of materials by analysis of wave form distortion, means including a source of alternating current for establishing a substantially sinusoidal alternating-current magnetic field, means for inserting in said field a specimen of material to be inspected, a test coil adapted to be placed in inductive relation to said specimen, an amplifier, an integrating circuit and a differentiating circuit coupled between said coil and said amplifier, a gate circuit, connections by which output current from said amplifier is impressed on said gate circuit, a variable phase shifter energized by alternating current from said source, a pulse generator controlled by said phase shifter, connections from said pulse generator to said gate circuit such that the output of said gate circuit is controlled in accordance with the phase of pulses from said pulse generator, and an indicator system responsive to the output of said gate circuit.

10. In a system for magnetic inspection of materials by analysis of wave form distortion, means including a source of alternating current for establishing a substantially sinusoidal alternating current magnetic field, means for inserting in said field a specimen of material to be inspected, a test coil adapted to be placed in inductive relation to said specimen, an amplifier, an integrating circuit comprising shunt capacitance and series resistance connected between said coil and said amplifier, a gate circuit, connections by which output current from said amplifier is impressed on said gate circuit, a variable phase shifter energized by alternating current from said source, a pulse generator controlled by said phase shifter, connections from said pulse generator to said gate circuit such that the output of said gate circuit is controlled in accordance with the phase of pulses from said pulse generator, and an indicator system responsive to the output of said gate circuit.

11. In a system for magnetic inspection of materials by analysis of wave form distortion, means including a source of alternating current for establishing a substantially sinusoidal alternating current magnetic field, means for inserting in said field a specimen of material to be inspected, a test coil adapted to be placed in inductive relation to said specimen, an amplifier, an integrating circuit comprising a series resistor and a shunt capacitor and a differentiating circuit comprising a series capacitor and a shunt resistor coupled through a third resistor between said coil and said amplifier, a gate circuit, connections by which output current from said amplifier is impressed on said gate circuit, a variable phase shifter energized by alternating current from said source, a pulse generator controlled by said phase shifter, connections from said pulse generator to said gate circuit such that the output of said gate circuit is controlled in accordance with the phase of pulses from said pulse generator, and an indicator system responsive to the output of said gate circuit.

12. In a system for magnetic inspection of materials by analysis of wave form distortion, means including a source of alternating current for establishing a substantially sinusoidal alternating-current magnetic field, means for inserting in said field a specimen of material to be inspected, a test coil adapted to be placed in inductive relation to said specimen, an amplifier, circuit elements forming an integrating circuit, circuit elements forming first and second differentiating circuits, switching means by which certain of said circuit elements may be selectively connected between said coil and said amplifier to comprise either an integrating circuit and a differentiating circuit effectively coupled in parallel, or two differentiating circuits effectively coupled in tandem, a gate circuit, connections by which output current from said amplifier is impressed on said gate circuit, a variable phase shifter energized by alternating current from said source, a pulse generator controlled by said phase shifter, connections from said pulse generator to said gate circuit such that the output of said gate circuit is controlled in accordance with the phase of pulses from said pulse generator, and an indicator system responsive to the output of said gate circuit.

13. The method of inspecting magnetic material by wave form analysis thereof which comprises generating an electromagnetic flux from an alternating energizing current, impressing said flux on a specimen of magnetic material to be inspected, whereby said flux is distorted, producing from said flux an electric potential wave of correspondingly distorted form, differentiating said potential wave to produce a differential wave of an instantaneous amplitude which is a function of the distortion of said potential wave, separately deriving from the source of said energizing current, pulses timed and of duration to correspond to the phase and duration of a portion of said differential wave desired to be indicated, selecting a portion of said differential wave by suppressing under the control of said pulses all of said differential wave except said desired portion, and indicating said selected portion.

JOSEPH M. CALLAN.

REFERENCES CITED

The following references are of record in the file of this patent:

UNITED STATES PATENTS

| Number | Name | Date |
|---|---|---|
| 1,954,996 | Hehn | Apr. 17, 1934 |
| 2,007,772 | Sams et al. | July 9, 1935 |
| 2,056,996 | Zuschlag | Oct. 13, 1936 |
| 2,337,231 | Cloud | Dec. 21, 1943 |
| 2,360,857 | Eldredge | Oct. 24, 1944 |
| 2,415,789 | Farrow | Feb. 11, 1947 |